US011185842B2

(12) United States Patent
Okumura et al.

(10) Patent No.: US 11,185,842 B2
(45) Date of Patent: Nov. 30, 2021

(54) CARBON DIOXIDE ADSORBENT, METHOD FOR MANUFACTURING THE SAME, AND CARBON DIOXIDE PROCESSING SYSTEM

(71) Applicant: KAWASAKI JUKOGYO KABUSHIKI KAISHA, Kobe (JP)

(72) Inventors: Takeshi Okumura, Kobe (JP); Masahiro Negami, Kobe (JP); Katsuhiro Yoshizawa, Akashi (JP); Akihito Kawano, Kobe (JP); Yoshimichi Nomura, Kobe (JP); Hidekazu Iwasaki, Kobe (JP); Shohei Nishibe, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 152 days.

(21) Appl. No.: 16/085,044

(22) PCT Filed: Mar. 14, 2017

(86) PCT No.: PCT/JP2017/010143
§ 371 (c)(1),
(2) Date: Sep. 14, 2018

(87) PCT Pub. No.: WO2017/159663
PCT Pub. Date: Sep. 21, 2017

(65) Prior Publication Data
US 2019/0126235 A1 May 2, 2019

(30) Foreign Application Priority Data
Mar. 14, 2016 (JP) .............................. JP2016-049103

(51) Int. Cl.
*B01J 20/22* (2006.01)
*B01D 53/62* (2006.01)
(Continued)

(52) U.S. Cl.
CPC .............. *B01J 20/22* (2013.01); *B01D 53/02* (2013.01); *B01D 53/62* (2013.01); *B01D 53/83* (2013.01);
(Continued)

(58) Field of Classification Search
CPC ... B01J 20/22; B01J 20/10; B01J 20/32; B01J 20/34; B01J 20/28
See application file for complete search history.

(56) References Cited

U.S. PATENT DOCUMENTS 7,767,004 B2 * 8/2010 Sayari ................ B01J 20/28083
95/285
2010/0154636 A1 6/2010 Liu et al.
(Continued)

FOREIGN PATENT DOCUMENTS

CN 105228725 A 1/2016
JP H04-200742 A 7/1992
(Continued)

OTHER PUBLICATIONS

JPH04200742A_English Translation (Year: 1992).*
(Continued)

*Primary Examiner* — Youngsul Jeong
(74) *Attorney, Agent, or Firm* — Oliff PLC

(57) ABSTRACT

A method for manufacturing a carbon dioxide adsorbent includes preparing an amine aqueous solution having an amine compound concentration ranging from 5% to 70% inclusive and a temperature ranging from 10° C. to 100° C. inclusive, impregnating silica gel with the amine aqueous solution, and aeration-drying the silica gel carrying the amine compound. The silica gel has a particle size ranging from 1 mm to 5 mm inclusive, an average pore diameter ranging from 10 nm to 100 nm inclusive, and a pore volume ranging from 0.1 cm$^3$/g to 1.3 cm$^3$/g inclusive.

3 Claims, 3 Drawing Sheets

(51) Int. Cl.
*B01D 53/83* (2006.01)
*B01J 20/32* (2006.01)
*B01J 20/28* (2006.01)
*B01J 20/34* (2006.01)
*C01B 33/159* (2006.01)
*B01D 53/02* (2006.01)
*B01J 20/10* (2006.01)
*B01D 53/08* (2006.01)

(52) U.S. Cl.
CPC ....... *B01J 20/103* (2013.01); *B01J 20/28004* (2013.01); *B01J 20/28016* (2013.01); *B01J 20/28069* (2013.01); *B01J 20/28073* (2013.01); *B01J 20/28076* (2013.01); *B01J 20/28078* (2013.01); *B01J 20/28083* (2013.01); *B01J 20/28085* (2013.01); *B01J 20/3204* (2013.01); *B01J 20/3231* (2013.01); *B01J 20/3246* (2013.01); *B01J 20/3248* (2013.01); *B01J 20/3251* (2013.01); *B01J 20/3272* (2013.01); *B01J 20/3293* (2013.01); *B01J 20/3425* (2013.01); *B01J 20/3433* (2013.01); *B01J 20/3466* (2013.01); *C01B 33/159* (2013.01); *B01D 53/08* (2013.01); *B01D 2253/106* (2013.01); *B01D 2253/20* (2013.01); *B01D 2253/25* (2013.01); *B01D 2257/504* (2013.01); *B01D 2258/0283* (2013.01); *C01P 2004/61* (2013.01); *C01P 2006/14* (2013.01); *C01P 2006/17* (2013.01); *Y02A 50/20* (2018.01); *Y02C 20/40* (2020.08); *Y02P 20/151* (2015.11)

(56) References Cited

U.S. PATENT DOCUMENTS

| | | |
|---|---|---|
| 2012/0160099 A1 | 6/2012 | Shoji et al. |
| 2014/0331864 A1 | 11/2014 | Ogino et al. |
| 2016/0136565 A1 | 5/2016 | Okumura et al. |

FOREIGN PATENT DOCUMENTS

| | | | |
|---|---|---|---|
| JP | H04200742 A | * 7/1992 | ............ B01J 20/22 |
| JP | 2012-501831 A | 1/2012 | |
| JP | 2012-35169 A | 2/2012 | |
| JP | 2013-121562 A | 6/2013 | |
| JP | 2015-113337 A | 6/2015 | |
| WO | 2011/013332 A1 | 2/2011 | |

OTHER PUBLICATIONS

Sayari et al. (Expanding the pore size of MCM-41 silicas: Use of amines as expanders in direct synthesis and post-synthesis procedures, 1999, Journal of Physical Chemistry, vol. 103, pp. 3651-3658) (Year: 1999).*

* cited by examiner

[Fig. 1]
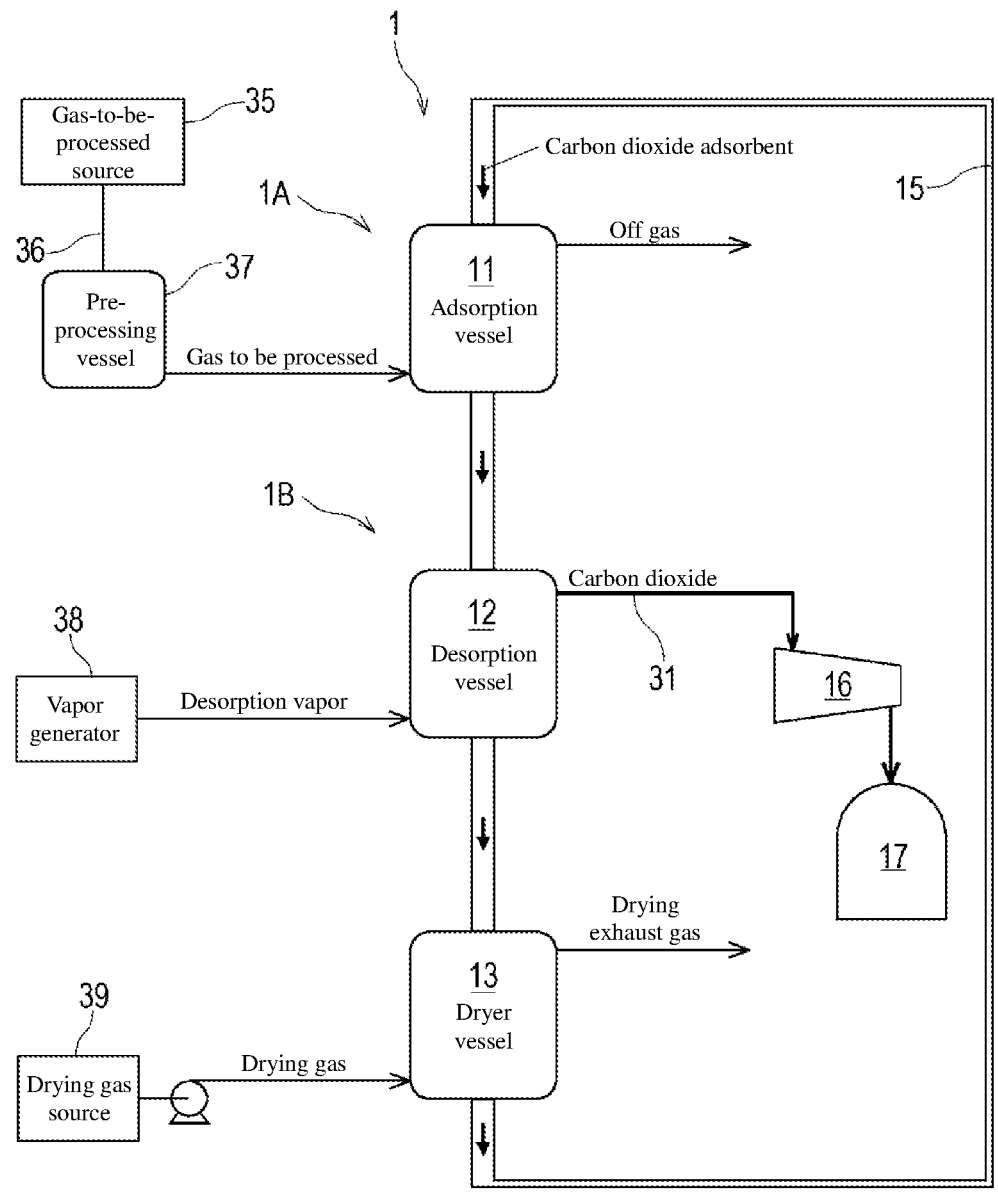
[Fig. 2A]
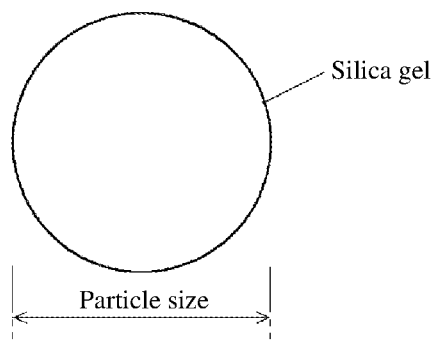

[Fig. 2B]
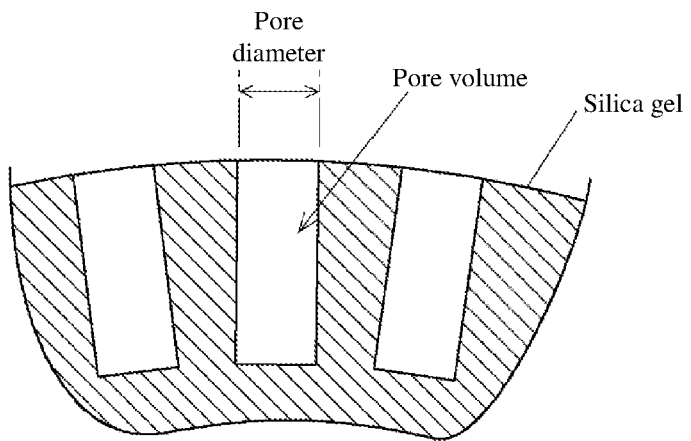
[Fig. 3]
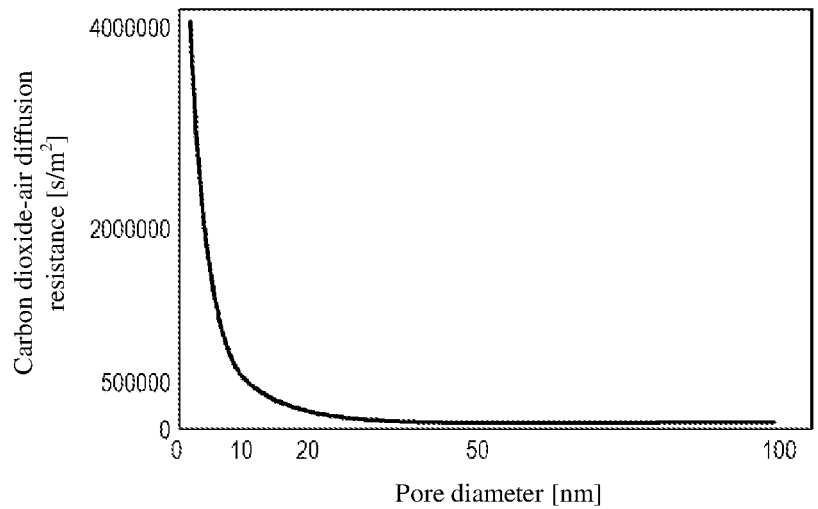
[Fig. 4]
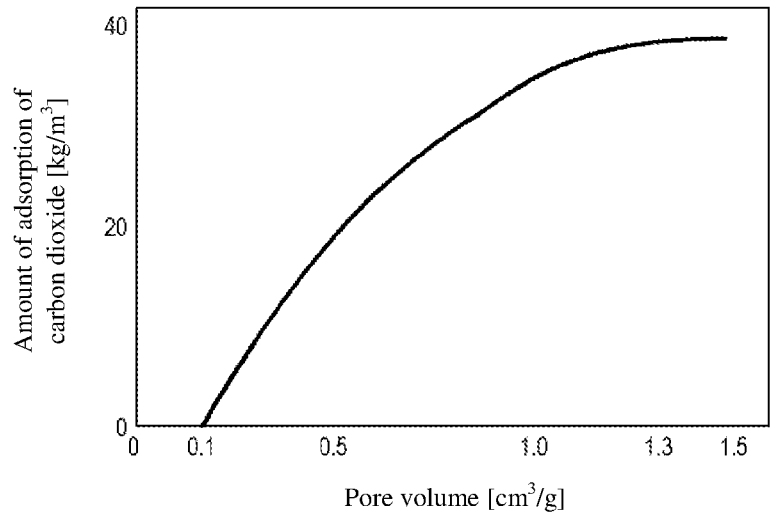

[Fig. 5]
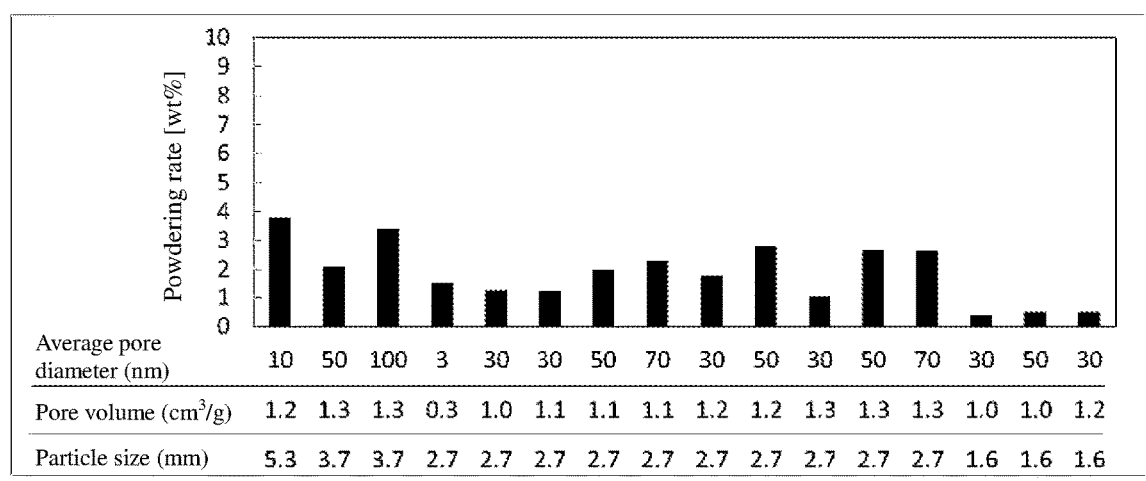

CARBON DIOXIDE ADSORBENT, METHOD FOR MANUFACTURING THE SAME, AND CARBON DIOXIDE PROCESSING SYSTEM

TECHNICAL FIELD

The present invention relates to a carbon dioxide adsorbent that reversibly adsorbs carbon dioxide contained in a gas to be processed, and a method for manufacturing the same, and a system using the carbon dioxide adsorbent.

BACKGROUND ART

A system configured to separate and remove carbon dioxide from a gas to be processed containing carbon dioxide by using a solid carbon dioxide adsorbent is known in the related art. The carbon dioxide is included in a process gas discharged from a combustion facility such as a boiler. PTL 1 and PTL 2 disclose carbon dioxide separation systems of this kind.

A carbon dioxide separation system (carbon dioxide removal system) disclosed in PTL 1 includes a container accommodating a carbon dioxide adsorbent, and is configured to reversibly adsorb carbon dioxide from a gas to be processed introduced into a container by using a solid carbon dioxide adsorbent. The carbon dioxide adsorbent includes amine, a carbon dioxide activating catalyst, and a porous substance configured to carry the amine and the catalyst.

The system in PTL 1 performs processing based on a "batch processing method" that repeats a processing cycle including an "adsorbing step" for adsorbing and removing carbon dioxide from a gas to be processed by using the carbon dioxide adsorbent and a "desorbing step" for desorbing the adsorbed carbon dioxide from the carbon dioxide adsorbent. In contrast, the system of PTL 2 described below performs the processing based on a "continuous processing method" that performs the adsorbing step and the desorbing step continuously in parallel.

The carbon dioxide separation system disclosed in PTL 2 includes a hopper, an adsorption tower where the adsorbing step is performed, a desorption tower (recovery tower) where the desorbing step is performed, a dryer tower where the adsorbent is dried, a cooling tower where the adsorbent is cooled, which are arranged downward in sequence in a vertical direction, and a conveyer configured to transfer the adsorbent from the cooling tower to the hopper. The carbon dioxide adsorbent accommodated in the hopper moves in sequence from the adsorption tower, the desorption tower, the dryer tower, and the cooling tower under its own weight, and is transported from the cooling tower into the hopper by the conveyer. In the adsorption tower and the desorption tower, a moving bed is defined by the carbon dioxide adsorbent moving downward in the tower and a gas moving upward in the tower. In the system of PTL 2, the carbon dioxide adsorbent is a porous substance carrying an amine compound, and the porous substance includes, for example, active carbon and active alumina.

CITATION LIST

Patent Literature

PTL 1: JP 2012-501831 A
PTL 2: JP 2013-121562 A

SUMMARY OF INVENTION

Technical Problem

In the system disclosed in PTL 1, the carbon dioxide adsorbent remains still with respect to the container. In contrast, in the system disclosed in PTL 2, the carbon dioxide adsorbent moves with respect to the container, and thus friction or collision occurs between the carbon dioxide adsorbent and the container, and between the carbon dioxide adsorbents. Therefore, specifically in the continuously processing method, a higher strength (in particular, abrasion resistance) is required more than the carbon dioxide adsorbent used in the batch processing method.

In view of such circumstances, it is an object of the present invention to provide a carbon dioxide adsorbent having a superior adsorptive property and a strength adapted to resist the usage in a continuous processing method, a method for manufacturing the same, and a system using the carbon dioxide adsorbent.

Solution to Problem

The present invention provides a method for manufacturing a carbon dioxide adsorbent including:
preparing an amine aqueous solution having an amine compound concentration ranging from 5% to 70% inclusive and a temperature ranging from 10° C. to 100° C. inclusive;
impregnating silica gel with the amine aqueous solution; and
aeration-drying the silica gel carrying the amine compound, in which
the silica gel has a particle size ranging from 1 mm to 5 mm inclusive, an average pore diameter ranging from 10 nm to 100 nm inclusive, and a pore volume ranging from 0.1 $cm^3/g$ to 1.3 $cm^3/g$ inclusive. However, all the above-described particle size, the pore volume, and the average pore diameter represent values of silica gel without carrying the amine compound.

The carbon dioxide adsorbent of the present invention includes silica gel and an amine compound carried by the silica gel, the silica gel having a particle size ranging from 1 mm to 5 mm inclusive, an average pore diameter ranging from 10 nm to 100 nm inclusive, and a pore volume ranging from 0.1 $cm^3/g$ to 1.3 $cm^3/g$ inclusive.

A carbon dioxide processing system according to the present invention includes an adsorption vessel including a moving bed, the moving bed being formed in an interior of the adsorption vessel by the carbon dioxide adsorbent. A gas-to-be-processed supply port is formed at a lower portion of the adsorption vessel and configured to receive a supply of a gas to be processed containing carbon dioxide, and an off-gas discharge port is formed at an upper portion of the adsorption vessel and configured to discharge an off gas, the off gas being a gas generated as a result of removal of carbon dioxide through adsorption to the carbon dioxide adsorbent.

The carbon dioxide adsorbent and a method for manufacturing the same provide a carbon dioxide adsorbent being superior in carbon dioxide adsorbing performance and having abrasion resistance adapted to endure usage in the carbon dioxide processing system employing the continuous processing method.

Advantageous Effects of Invention

The present invention provides a carbon dioxide adsorbent having a superior adsorptive property and a sufficient strength adapted to resist the usage in a continuous processing method, a method for manufacturing the same, and a system using the carbon dioxide adsorbent.

BRIEF DESCRIPTION OF DRAWINGS

FIG. 1 is a view illustrating a schematic configuration of a carbon dioxide processing system adapted to use a carbon dioxide adsorbent according to the present invention.

FIG. 2A is a view schematically illustrating a particle size of silica gel.

FIG. 2B is a view schematically illustrating a pore volume and a pore diameter of the silica gel.

FIG. 3 is graph illustrating a relationship between carbon dioxide-air diffusion resistance in a porous substance and the pore diameter.

FIG. 4 is a graph illustrating a relationship between the pore volume of silica gel in an adsorbent composed of silica gel carrying diethanolamine and an amount of adsorption of carbon dioxide.

FIG. 5 is a graph of a result of a rotation abrasion test conducted on silica gel.

DESCRIPTION OF EMBODIMENTS

A carbon dioxide adsorbent according to the present invention (hereinafter, referred to simply as an "adsorbent") is used for reversibly adsorbing and removing carbon dioxide from a gas to be processed containing carbon dioxide. The adsorbent has a superior carbon dioxide adsorbing performance and superior abrasion resistance and is suitable to be used in a system for adsorbing and removing carbon dioxide from a gas to be processed in a continuous processing method.

[Carbon Dioxide Processing System]

FIG. 1 illustrates a schematic configuration of a carbon dioxide processing system 1 adapted to use a carbon dioxide adsorbent. The carbon dioxide processing system 1 illustrated in FIG. 1 is a composite system employing a continuous processing method including a carbon dioxide separation system 1A configured to selectively separate carbon dioxide contained in a gas to be processed by using an adsorbent and a carbon dioxide recovery system 1B configured to desorb (separate) and collect carbon dioxide from the adsorbent.

The carbon dioxide processing system 1 includes an adsorption vessel 11, a desorption vessel 12, a dryer vessel 13, and a conveyer 15 configured to convey the adsorbent from an exit port of the dryer vessel 13 to an inlet port of the adsorption vessel 11. The adsorption vessel 11, the desorption vessel 12, and the dryer vessel 13 are arranged in this sequence from above in the vertical direction to allow the adsorbent to move from the adsorption vessel 11 to the dryer vessel 13 by gravity.

The adsorption vessel 11 receives a supply of the adsorbent conveyed by the conveyer 15 from an inlet port provided on an upper portion at a predetermined supply rate. The adsorbent is ejected from an exit port provided at a lower portion of the adsorption vessel 11 at a predetermined ejection speed.

A gas to be processed generated by a gas-to-be-processed source 35 is introduced to the lower portion of the adsorption vessel 11 through a gas-to-be-processed supply pipe 36. The gas to be processed contains 10 to 30% of carbon dioxide such as a combustion exhaust gas at a pressure close to an ordinary pressure. The gas-to-be-processed supply pipe 36 may be provided with at least one pre-processing vessel 37. In the pre-processing vessel 37, the gas to be processed is cooled down to an adequate temperature for adsorption action of carbon dioxide. The gas to be processed introduced into the adsorption vessel 11 may be subjected to preprocessing such as desulfurization, dedusting, temperature decrease, and dehumidification in addition to cooling.

In the adsorption vessel 11, a moving bed is formed, in which the gas to be processed flowing upward and the adsorbent flowing downward come into contact with each other. The adsorbent coming into contact with the gas to be processed selectively adsorbs carbon dioxide contained in the gas to be processed. The temperature of the adsorbent at the time of adsorption is, for example, 40° C. The gas to be processed (off gas) free from carbon dioxide after separation and removal of carbon dioxide is discharged from the upper portion of the adsorption vessel 11. In contrast, the adsorbent that has adsorbed carbon dioxide is ejected from the lower portion of the adsorption vessel 11 and moves to an inlet port of the desorption vessel 12 under its own weight.

In the desorption vessel 12, the adsorbent that has adsorbed carbon dioxide is supplied from an inlet port provided at an upper portion and the adsorbent is ejected from an exit port provided at a lower portion at a predetermined ejection rate to let the adsorbent move in the vessel from the top toward the bottom at a predetermined rate. A lower portion of the desorption vessel 12 receives a supply of desorption vapor supplied from a vapor generator 38.

In the desorption vessel 12, a moving bed is formed, in which desorption vapor flowing upward and the adsorbent flowing downward come into contact with each other. When the desorption vapor comes into contact with the adsorbent, the desorption vapor is condensed on a surface of the adsorbent, and simultaneously emits condensation heat. Carbon dioxide is separated from the adsorbent by using the condensation heat as energy for separation.

A carbon dioxide holder 17 is connected to the upper portion of the desorption vessel 12 via a carbon dioxide recovery pipe 31. The carbon dioxide recovery pipe 31 is provided with a pump 16 configured to feed a gas in the desorption vessel 12 to the carbon dioxide holder 17. A gas in the desorption vessel 12 (that is, carbon dioxide) is forcedly discharged to the carbon dioxide recovery pipe 31, is compressed by the pump 16, and is stored in the carbon dioxide holder 17. In contrast, the adsorbent containing condensed water after desorption of carbon dioxide is ejected from the lower portion of the desorption vessel 12 and moves to an inlet port of the dryer vessel 13 under its own weight.

In the dryer vessel 13, the adsorbent containing the condensed water is supplied from an inlet port provided at an upper portion, and the adsorbent is ejected from an exit port provided at a lower portion at a predetermined ejection rate to let the adsorbent move in the vessel from the top toward the bottom at a predetermined rate. The adsorbent is dried as it moves in the dryer vessel 13. The adsorbent is dried by contact between drying gas supplied from the drying gas source 39 to a lower portion of the dryer vessel 13 and flowing upward in the vessel and an adsorbent moving downward in the vessel. The drying gas (drying exhaust gas) used for drying the adsorbent is discharged from the upper portion of the dryer vessel 13

The adsorbent after drying is ejected from the lower portion of the dryer vessel 13, drops onto the conveyer 15, is transferred to the adsorption vessel 11 by the conveyer 15 while being cooled, and is reused as the adsorbent of carbon dioxide.

[Carbon Dioxide Adsorbent]

The adsorbent (carbon dioxide adsorbent) used in the carbon dioxide processing system 1 is formed by making silica gel carry an amine compound.

The amine compound is at least one compound selected from a group of amines having at least one hydroxyl group and polyamines. In other words, the amine compound may contain a mixture of amines and polyamines. Amines and polyamines of this type are known to reversibly desorb carbon dioxide, that is, to adsorb and desorb carbon dioxide. Examples of the amine compound including amines having at least one hydroxyl group include monoethanolamine, diethanolamine, and triethanolamine. Examples of the amine compound including polyamines include polyethyleneimine, ethylenediamine, diethylenetriamine, triethylenetetramine, tetraethylenepentamine, and pentaethylenehexamine.

The silica gel described above has particle sizes ranging from 1 mm to 5 mm inclusive. The silica gel has pore volumes ranging from 0.1 $cm^3/g$ to 1.3 $cm^3/g$ inclusive. In addition, the average pore diameter of silica gel ranges from 10 nm to 100 nm inclusive. All the particle size, the pore volume, and the average pore diameter described above are values of silica gel without carrying the amine compound.

FIG. 2A is a view schematically illustrating the particle size of silica gel, and FIG. 2B is a view schematically illustrating the pore volume and the pore diameter of silica gel. In FIG. 2B, a cross section of silica gel near a surface is illustrated in an enlarged scale. As illustrated in FIG. 2A, the silica gel is a spherical particle. The "spherical" particle does not necessarily mean an exactly spherical particle, but is a particle having a shape that allows more than 90% in volume to roll down when placed on a flat and smooth plate inclined by approximately 30 degrees from a horizontal position.

As described above, carbon dioxide adsorbent formed of silica gel having particle sizes ranging from 1 mm to 5 mm inclusive as described above as a base material also have particle sizes ranging from 1 mm to 5 mm inclusive. Although silica gel carries amine compound, the amine compound enters pores formed in the interior of the silica gel. Therefore, the diameter of silica gel is not much increased by carrying the amine compound.

When the particle size of the carbon dioxide adsorbent is smaller than 1 mm, the adsorbent flows with a smaller amount of gas, and thus the moving bed is not formed. In contrast, when the particle size of carbon dioxide adsorbent exceeds 5 mm, the weight of the adsorbent increases with an increase of particle size. Therefore, the degree of abrasion caused by an impact subjected when the carbon dioxide adsorbent falls down increases, and thus lifetime of the adsorbent is dramatically shortened. Therefore, using carbon dioxide adsorbent having particle sizes ranging from 1 mm to 5 mm inclusive facilitates formation of the moving bed to allow an adsorbent and a gas to be processed to come into suitable counterflow contact with each other, and the adsorbent can be provided with a suitable life time.

As used herein, the term the "particle size" of carbon dioxide and silica gel is intended to mean the particle diameter. The particle sizes of carbon dioxide and the silica gel can be measured by following steps (1) to (4), for example.

(1) 100 pieces or more of silica gel sample are arranged on a black felt in such a manner that mutual contact of the particles is avoided as much as possible.

(2) An image of particles of the silica gel is shot with a view range of 100 mm×140 mm.

(3) Using an image processing software ImageJ (National Institutes of Health, NIH), the image obtained through shooting is binarized to obtain a surface area of each particle.

(4) Assuming that the particle has an exact spherical shape, the particle size is obtained from the obtained surface area of each particle.

Note that from the obtained particle sizes, a number-average diameter (=Σ (particle size)/(evaluated number of particles)) is obtained, and the number-average diameter may be used as the particle size.

As illustrated in FIG. 2B, the average pore diameter of silica gel is an average value of diameters of pores formed on the surface of silica gel. The pore volume of the silica gel is the capacity of the pores.

The pore volume of silica gel is obtained by the mercury intrusion technique. The average pore diameter of silica gel is obtained by obtaining pore diameter distribution by the mercury intrusion technique, and then obtaining an average pore diameter (median diameter) at the time of intrusion of mercury of 50% of the entire pore volume. The mercury intrusion technique is a technique of applying a pressure for intruding mercury into pores of powder by using a characteristic of mercury having a high surface tension and obtaining the specific surface or the pore distribution from the pressure and the intruded amount of mercury. For example, a mercury porosimeter (PASCL240) manufactured by Thermo Qurest Italia can be used.

The average pore diameter of silica gel significantly affects the adsorption velocity of the adsorbent. The adsorption velocity of the adsorbent depends on the velocity of diffusion of carbon dioxide diffusion in the pore and the velocity of the adsorption reaction of the adsorbent. The velocity of the adsorption reaction is sufficiently higher than the velocity of diffusion of carbon dioxide in the pore, and thus the actual adsorption velocity of the adsorbent is regulated by the velocity of diffusion of carbon dioxide in the pore.

FIG. 3 is graph illustrating a relationship between carbon dioxide-air diffusion resistance in a porous substance and the pore diameter. FIG. 3 shows that the carbon dioxide-air diffusion resistance is abruptly and significantly increased when the pore diameter is reduced to a size smaller than 10 nm. This is considered to be because the rate of Knudsen diffusion in the total diffusion resistance in the pore becomes 90% or higher. Therefore, it is considered that achievement of saturation adsorption of carbon dioxide to the adsorbent within the actual processing time is difficult when the average pore diameter of silica gel is reduced to a size smaller than approximately 10 nm. In contrast, when the average pore diameter of silica gel exceeds 100 nm, the strength of bone structure of primary particles of silica constituting silica gel is lowered, and thus the particle strength required for the adsorbent is not satisfied.

From these reasons, by using silica gel having an average pore diameter in the range from 10 nm to 100 nm inclusive, the adsorption velocity of carbon dioxide of the adsorbent is maintained in a suitable range, and the particle strength required for the adsorbent is achieved.

The average pore diameter of silica gel may be controlled by applying steaming processing to silica gel. More specifically, the average pore diameter can be controlled in a range from 10 nm to 100 nm inclusive by adjusting the pressure and pH of xerogel at the time of steaming. The steaming process is normally performed by circulating steam in an autoclave under pressurization, and the processing time is normally from 10 minutes to 24 hours. The pressure at this time is of 0.5 to 20 Kg/cm². In addition, the pH of xerogel during the steaming processing is preferably controlled within a range from 5 to 9.

FIG. 4 is a graph illustrating a relationship between the pore volume of silica gel in an adsorbent composed of silica gel carrying diethanolamine (concentration of amine solution: 40%) and an amount of adsorption of carbon dioxide. FIG. 4 shows that adsorption of carbon dioxide is enabled with an adsorbent having a pore volume of silica gel of approximately 0.1 cm³/g or larger.

FIG. 4 also shows that, as the pore volume of silica gel becomes larger, the amount of adsorption of carbon dioxide is increased. However, when the pore volume of silica gel is excessively increased, the strength of silica gel is reduced to a level difficult to maintain the spherical shape, and consequently, the particle strength required for the adsorbent cannot be satisfied. Accordingly, based on FIG. 4, an upper limit of the pore volume of silica gel is suitably defined to 1.3 cm³/g, at which the amount of adsorption of carbon dioxide is saturated.

From these reasons, by using silica gel having a pore volume ranging from 0.1 cm³/g to 1.3 cm³/g inclusive, adsorption of carbon dioxide is enabled, and simultaneously, a particle strength required for the adsorbent can be provided. From the viewpoint of maintaining the spherical shape of silica gel, a condition that the specific area ranges from 10 m²/g to 300 m²/g inclusive for silica gel having a particle size ranging from 1 mm to 5 mm inclusive may be imposed. The specific are of silica gel can be obtained by mercury intrusion technique in the same manner as the average pore diameter and the pore volume.

[Method for Manufacturing Carbon Dioxide Adsorbent]

The above-described adsorbent can be manufactured by a method described below.

Firstly, an amine aqueous solution having an amine compound concentration ranging from 5% to 70% inclusive and a temperature ranging from 10° C. to 100° C. inclusive is prepared.

The viscosity of the amine aqueous solution is known to be lowered with an increase in temperature. Therefore, the temperature of the amine aqueous solution is preferably 10° C. or higher in order to make silica gel uniformly carry amine compound. In contrast, when the temperature of the amine aqueous solution exceeds 100° C., the amine compound tends to oxidize or evaporate easily. Therefore, the suitable temperature of the amine aqueous solution ranges from 10° C. to 100° C. inclusive.

The amine compound concentration in the amine aqueous solution preferably is an adequate value according to the amine compound in a range from 5 wt % to 70 wt % inclusive. For example, when the amine compound is diethanolemine, a suitable concentration of the amine compound in the amine aqueous solution ranges from 5 wt % to 55 wt % inclusive. For example, when the amine compound is polyethyleneimine, a concentration around 10 wt % is preferable because the polyethyleneimine is high viscous.

When the concentration of the amine compound in the amine aqueous solution is lower than a lower limit value, the amount of amine compound carried by silica gel is not sufficient, and a huge amount of sump solution results after carrying processing. In contrast, when the concentration of the amine compound in the amine aqueous solution exceeds an upper limit value, the amine compound closes the pores of silica gel, and thus lowering of adsorptive performance of the adsorbent may result. In the range of the concentration of the amine compound from 5% to 70% 5 wt % to 70 wt %, the amount of carried amine on the silica gel increases with an increase in concentration of the amine compound in the amine aqueous solution, and the specific gravity of the adsorbent and the amount of carbon dioxide adsorbed by the adsorbent increase in proportion. From these reasons, by setting the concentration of the amine compound in the amine aqueous solution adequately in a range from 5w % to 70 wt % inclusive, carbon dioxide adsorbent according to a design specification of the adsorbent can be manufactured.

Subsequently, silica gel is impregnated with the amine aqueous solution prepared as described above. The duration of impregnation of silica gel is, for example, 24 hours.

Finally, excess of liquid adhered to silica gel is removed by a method such as suction filtration, and then the silica gel carrying the amine compound is air-dried at a temperature close to the room temperature. The adsorbent can be manufactured in steps described above.

It is known that part of silica gel is subjected to breakage or cracking due to adsorption of moisture in a process of impregnating silica gel with amine aqueous solution in the method for manufacturing the adsorbent described above. The adsorbent having no spherical shape due to breakage or cracking does not have a sufficient strength (abrasion resistance) for being used in the carbon dioxide processing system employing the continuous processing method, and is not suitable for use. Therefore, only the adsorbent having a spherical shape is selectively taken out from the manufactured adsorbent to be used for adsorption of carbon dioxide.

In order to improve yield of adsorbent in manufacture, silica gel having a waterproof property may be used as the silica gel described above. As used herein, the term "silica gel having waterproof property" is defined as silica gel having a water proof property N defined by the following expression (1), and N is not lower than 45%.

$$N=(W/W_0)\times 100 \qquad (1)$$

where N: waterproof property [%], $W_0$: total number [pieces] of particles of silica gel impregnated with water, W: number of silica gel particles not being subjected to cracks out of $W_0$.

The silica gel having the waterproof property as described above may be commercially available waterproof spherical silica. The waterproof spherical silica can be manufactured by sintering spherical silica xerogel prepared by drying silica hydrogel obtained, for example, by neutralizing alkaline silicate aqueous solution at a temperature ranging from 100 to 1000° C. by superheat steam at a temperature ranging from 500 to 1000° C.

The present inventors have confirmed that when the silica gel having the waterproof property as described above is employed as a material, the silica gel is rarely subjected to breakage or cracks in a process of impregnating the silica gel with amine aqueous solution in the method for manufacturing the above-described adsorbent.

EXAMPLES

<Procedure of Preparing Sample of Carbon Dioxide Adsorbent>

A sample of carbon dioxide adsorbent was prepared in the procedure from (1) to (5) given below.

(1) Approximately 300 mL of a base material (silica gel) was extracted and the weight (W) was measured.

(2) A drug (amine compound) was diluted to a predetermined concentration of carried solution (%) and was put into a bottle.

(3) The base material in (1) was put into the bottle of (2), and was left standstill at a room temperature for eight hours. Here, the ratio of weight between the base material and the drug was 1:3.

(4) The base material was taken out from (3) and was subjected to centrifugation (1100 rpm).

(5) The container was filled with the base material and dry gas (nitrogen gas at 40° C. at a flow rate of 15 L/min.) was flowed to aeration-dry the base material carrying the drug. Note that two hours after the time point when the gas temperature at the exit port of the dryer vessel for drying the base material that carries the drug was set to the condition for terminating the drying operation for the material carrying the drug (that is, carbon dioxide adsorbent).

<Carbon Dioxide Adsorption Test>

In order to evaluate the carbon dioxide adsorptive performance of a carbon dioxide adsorbent, a carbon dioxide adsorption test (column test) was conducted for the carbon dioxide adsorbent sample in the following procedure from (1) to (4).

(1) An adsorption vessel having an inner diameter of 25 mm was filled with a sample to a height of 300 mm. The amount of filled sample was 147 mL.

(2) The adsorptive gas was flowed into the bypass line and confirmed that the concentration was 10.0%. The adsorptive gas contained carbon dioxide of 10 volume %, having a moisture of 5% RH or less and a temperature of 25° C. The superficial velocity of the adsorptive gas was 0.05 m/s.

(3) The adsorptive gas was flowed into the adsorption vessel, and the gas concentration at the exit port of the adsorption vessel was measured.

(4) The fact that the concentration of the gas at the exit port reached 10.0% (that is, the saturated adsorption) was confirmed and the adsorption step was terminated.

<Carbon Dioxide Adsorption Test Result 1>

Samples 1 to 5 were prepared from a base material common in physical property but different in drug carrying conditions (concentration of carried solution and type of drug) according to the above-described sample preparation procedure. The physical property of the base material (silica gel) and the drug carrying conditions of the respective samples are shown in the following Table 1.

TABLE 1

| Sample | Pore diameter (nm) | Pore Volume (ml/g) | Average Particle Size (mm) | Drug Type | Concentration of Carried Solution (%) | Amount of $CO_2$ adsorption (kg · $CO_2/m^3$) |
|---|---|---|---|---|---|---|
| 1 | 30 | 1.0 | 2.7 | DEA | 40 | 34.0 |
| 2 | 30 | 1.0 | 2.7 | DEA | 60 | 37.3 |
| 3 | 30 | 1.0 | 2.7 | PEHA | 20 | 50.9 |
| 4 | 30 | 1.0 | 2.7 | PEHA | 40 | 36.2 |
| 5 | 30 | 1.0 | 2.7 | TEPA | 40 | 49.3 |

DEA: diethanolamine
PEHA: pentaethylenehexamine
TEPA: tetraethylenepentamine

An amine compound used in Sample 1 and Sample 2 was diethanolamine (DEA), and an amine compound used in Sample 3 and Sample 4 was pentaethylenehexamine (PEHA), and an amine compound used in Sample 5 was tetraethylenepentamine (TEPA). The concentration of carried solution of the drug in Sample 1, Sample 4, and Sample 5 was 40%, the concentration of carried solution of Sample 2 was 60%, and the concentration of carried solution of Sample 3 was 20%.

The adsorption test results of the above-described Samples 1 to 5 were as follows. The amount of carbon dioxide adsorbed by Sample 1 was 35.4 $kgCO_2/m^3$, the amount of carbon dioxide adsorbed by Sample 2 was 52.1 $kgCO_2/m^3$, the amount of carbon dioxide adsorbed by Sample 3 was 33.1 $kgCO_2/m^3$, the amount of carbon dioxide adsorbed by Sample 4 was 58.4 $kgCO_2/m^3$, and the amount of carbon dioxide adsorbed by Sample 5 was 65.9 $kgCO_2/m^3$. All the amounts of carbon dioxide adsorbed by these samples were 30 $kgCO_2/m^3$ or more. From this result, the carbon dioxide adsorptive performance of these samples can be evaluated objectively to be good.

From these results described above, Samples 1 to 5 were recognized to have superior adsorptive property. No breakage of carbon dioxide adsorbent was found visually in Samples 1 to 5.

<Carbon Dioxide Adsorption Test Result 2>

Samples 6 to 15 were prepared under the same drug carrying conditions (the concentration of carried solution was 40 or 60%, the type of drug was diethanolamine (DEA)), from base materials different in physical property according to the above-described sample preparation procedure. The physical properties of the base material (silica gel) and the drug carrying conditions of Samples 6 to 15 are shown in the following Table 2.

TABLE 2

| Sample | Pore diameter (nm) | Pore Volume (ml/g) | Average Particle Size (mm) | Drug Type | Concentration of Carried Solution (%) | Amount of $CO_2$ adsorption (kg · $CO_2/m^3$) |
|---|---|---|---|---|---|---|
| 6  | 10 | 1.0 | 2.7 | DEA | 40 | 34.0 |
| 7  | 30 | 1.0 | 1.6 | DEA | 40 | 37.3 |
| 8  | 30 | 1.0 | 1.6 | DEA | 60 | 50.9 |
| 9  | 70 | 1.1 | 2.7 | DEA | 40 | 36.2 |
| 10 | 70 | 1.1 | 2.7 | DEA | 60 | 49.3 |
| 11 | 30 | 1.3 | 2.7 | DEA | 40 | 35.9 |
| 12 | 30 | 1.3 | 2.7 | DEA | 60 | 47.2 |
| 13 | 70 | 1.3 | 2.7 | DEA | 40 | 39.5 |
| 14 | 70 | 1.3 | 2.7 | DEA | 60 | 56.3 |
| 15 | 80 | 1.0 | 2.7 | DEA | 40 | 34.4 |

Sample 6 was prepared by making a base material having a pore diameter of 10 mm, a pore volume of 1.0 ml/g, and an average particle size of 2.7 mm carry DEA having a concentration of carried solution of 40%. Sample 7 was prepared by making a base material having a pore diameter of 30 mm, a pore volume of 1.0 ml/g, and an average particle size of 1.6 mm carry DEA having a concentration of carried solution of 40%. Sample 8 was prepared by making a base material having a pore diameter of 30 mm, a pore volume of 1.0 ml/g, and an average particle size of 1.6 mm carry DEA having a concentration of carried solution of 60%. Sample 9 was prepared by making a base material having a pore diameter of 70 mm, a pore volume of 1.1 ml/g, and an average particle size of 2.7 mm carry DEA having a concentration of carried solution of 40%. Sample 10 was prepared by making a base material having a pore diameter of 70 mm, a pore volume of 1.1 ml/g, and an average particle size of 2.7 mm carry DEA having a concentration of carried solution of 60%. Sample 11 was prepared by making a base material having a pore diameter of 30 mm, a pore volume of 1.3 ml/g, and an average particle size of 2.7 mm carry DEA having a concentration of carried solution of 40%. Sample 12 was prepared by making a base material having a pore diameter of 30 mm, a pore volume of 1.3 ml/g, and an average particle size of 2.7 mm carry DEA having a concentration of carried solution of 60%. Sample 13 was prepared by making a base material having a pore diameter of 70 mm, a pore volume of 1.3 ml/g, and an average particle size of 2.7 mm carry DEA having a concentration of carried solution of 40%. Sample 14 was prepared by making a base material having a pore diameter of 70 mm, a pore volume of 1.3 ml/g, and an average particle size of 2.7 mm carry DEA having a concentration of carried solution of 60%. Sample 15 was prepared by making a base material having a pore diameter of 80 mm, a pore volume of 1.0 ml/g, and an average particle size of 2.7 mm carry DEA having a concentration of carried solution of 40%.

According to the adsorption test results for the above-described Samples 6 to 15, the amounts of carbon dioxide adsorbed by Samples 6, 7, 9, 11, 13, and 15 ranged from 34.0 to 39.9 $kgCO_2/m^3$, the amount of carbon dioxide adsorbed by Samples 10 and 12 ranged from 40.0 to 49.9 $kgCO_2/m^3$, and the amount of carbon dioxide adsorbed by Samples 3 and 14 ranged from 50.0 to 59.9 $kgCo_2/m^3$. In other words, all of Samples 6 to 15 were found to have superior carbon dioxide adsorptive performance.

From the results described thus far, carbon dioxide adsorbent prepared by making a base material (silica gel) having a particle size ranging from 1 mm to 5 mm inclusive, an average pore diameter ranging from 10 nm to 100 nm inclusive, and a pore volume ranging from 0.1 $cm^3/g$ to 1.3 $cm^3/g$ inclusive carry an amine compound was found to have superior carbon dioxide adsorptive performance.

<Rotation Abrasion Test>

In order to evaluate abrasion resistance of carbon dioxide adsorbent, a rotation abrasion test was conducted in the following procedures (1) to (2).

(1) 245 ml of a sample was put in a cylindrical drum having a single partition wall, and the drum was rotated at 60 rpm for 48 hours.

(2) A powdering rate was calculated from a change in weight of the sample between before and after the rotation of the drum.

Detailed procedure of the test other than the conditions described above were compliant with JIS K1150; 1994 "5.9 particle strength—5.9.1 a case of spalled particles having a lowest grain size distribution limit of 1.4 mm or more".

Empirically known in the rotation abrasion test is that if the powdering rate of the sample was equal to or lower than "5 wt %", a carbon dioxide adsorbent prepared from the corresponding sample according to the carbon dioxide adsorbent sample preparation procedure can endure the usage in the carbon dioxide separation system of the continuous processing method having a moving bed in the apparatus. Therefore, a carbon dioxide adsorbent prepared from a sample having a powdering rate of 5 wt % or lower was evaluated to have abrasion resistance that can endure the usage in the carbon dioxide processing system employing the continuous processing method.

FIG. 5 is a graph of a result of a rotation abrasion test conducted on silica gel. As is clear from the result of the rotation abrasion test, all the samples (silica gel) having an average particle size ranging from approximately 1 mm to 5 mm inclusive, a pore diameter ranging from approximately 10 nm to 100 nm inclusive, and a pore volume ranging from approximately 0.1 $cm^3/g$ to 1.3 $cm^3/g$ inclusive had powdering rates not higher than 5 wt %. Therefore, the carbon dioxide adsorbent prepared by making silica gel having a particle size ranging from 1 mm to 5 mm inclusive, an average pore diameter ranging from 10 nm to 100 nm inclusive, and a pore volume ranging from 0.1 $cm^3/g$ to 1.3 $cm^3/g$ inclusive carry an amine compound has abrasion resistance that can endure the usage in the carbon dioxide separation system of the continuous processing method.

The invention claimed is:

1. A method for manufacturing a carbon dioxide adsorbent comprising:

preparing an amine aqueous solution having an amine compound at a concentration that is in a range of from 5 wt % to 70 wt % inclusive and a temperature that is in a range of from 10° C. to 100° C. inclusive;

impregnating silica gel with the amine aqueous solution; and aeration-drying the silica gel carrying the amine compound, wherein the silica gel has: (i) spherical shape, (ii) a particle size that is in a range of from 1 mm to 5 mm inclusive, (iii) an average pore diameter that is in a range of from 30 nm to 100 nm inclusive, (iv) a pore volume that is in a range of from 0.1 cm$^3$/g to 1.3 cm$^3$/g inclusive, and (v) a waterproof property N that is defined by an expression (1) and that is not lower than 45%, $$N=(W/W_0)\times 100 \tag{1}$$

where

N is the waterproof property in percentage (%) of the silica gel, $W_0$ is a total number of particles of the silica gel immersed in water, and W is a number of particles of the silica gel not subjected to breakage out of $W_0$.

2. The method for manufacturing a carbon dioxide adsorbent according to claim 1, wherein the amine compound is at least one compound selected from a group of amines having at least one hydroxyl group and polyamines.

3. The method for manufacturing a carbon dioxide adsorbent according to claim 1, wherein the average pore diameter is in a range of from 70 nm to 100 nm inclusive.

* * * * *